J. W. TRAFTON.
Self-Closing Faucets.
No. 143,042.                  Patented September 23, 1873.
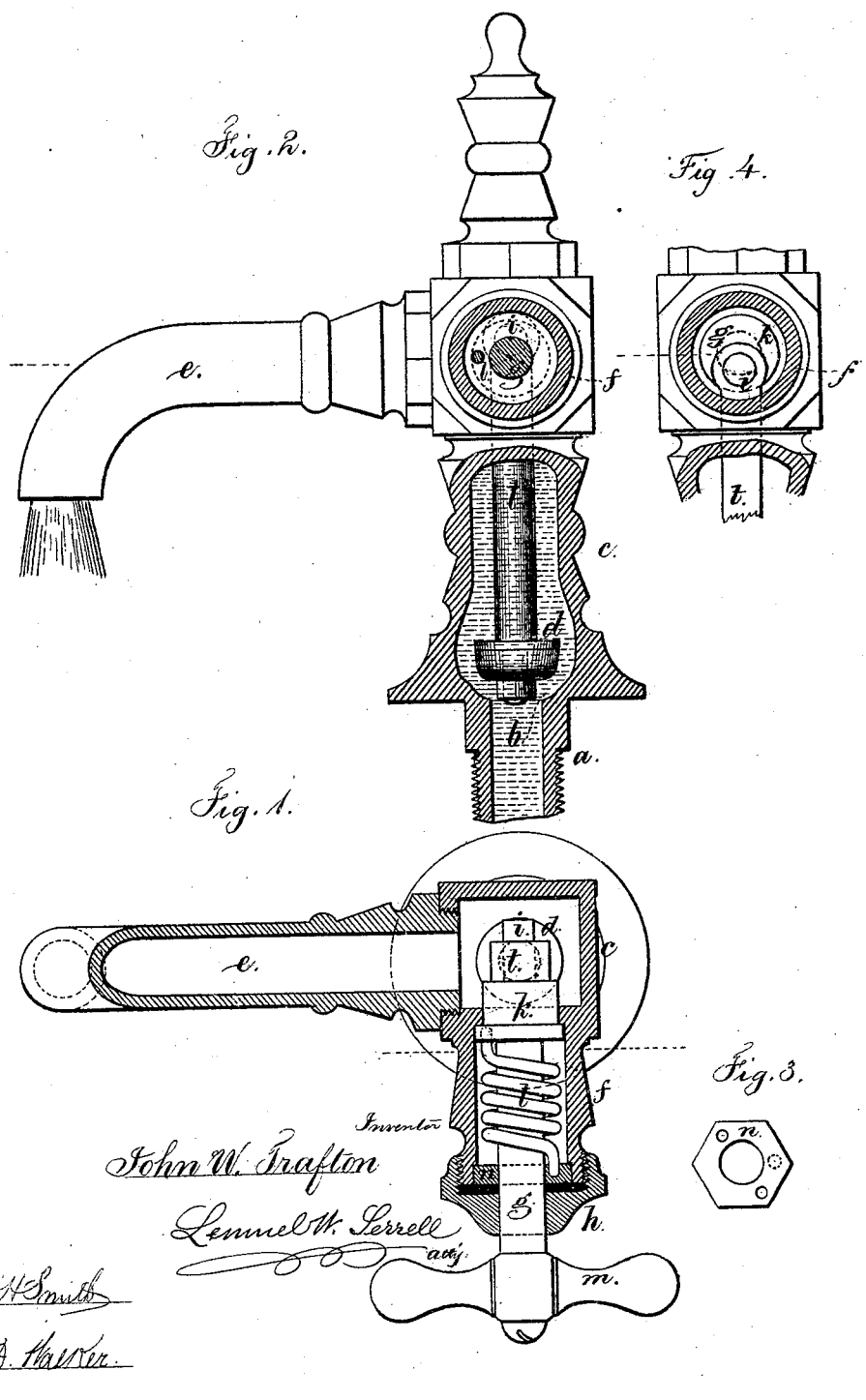

UNITED STATES PATENT OFFICE.

JOHN W. TRAFTON, OF CHICOPEE FALLS, MASSACHUSETTS.

IMPROVEMENT IN SELF-CLOSING FAUCETS.

Specification forming part of Letters Patent No. 143,042, dated September 23, 1873; application filed December 10, 1872.

*To all whom it may concern:*

Be it known that I, JOHN W. TRAFTON, of Chicopee Falls, in the State of Massachusetts, have invented an Improvement in Self-Closing Faucets, of which the following is a specification:

Before this invention, cocks and faucets had been provided with a valve, acted upon by a crank to draw the valve to its seat, as shown in the patent of E. Stebbins, February 1, 1848, and the patent of Thibault, granted in France July 27, 1850. In these cases the crank is operated by a lever or handle, and hence the surface of the valve or seat, whether elastic or non-elastic, was liable to injury by undue pressure resulting from the leverage and crank action.

My invention is made for avoiding this difficulty; and consists in the combination of a spring with the crank and valve, whereby the valve is self-closing, and is pressed to its seat with the uniform power exerted by the spring, and the risk of injury to the valve or seat is lessened, and the faucet cannot be left open accidentally.

In the drawing, Figure 1 is a horizontal section of the faucet, and Fig. 2 is a partial vertical section, showing the crank and connection to the valve. Fig. 3 is the polygonal bush detached; and Fig. 4 is a partial section, showing the valve-stem and crank.

The tubular connection $a$ to the cock is of any desired character. The valve-seat $b$ is in the body $c$ of the cock, and upon this seat the valve $d$ rests; but when the valve is opened there is the necessary passage-way within the body $c$ around the valve. The bib or delivery-pipe $e$ is of any desired character, and passes out from the body $c$ either at the end or side. The shaft and spring that act upon the crank and valve are contained in the cylinder or socket $f$, that may be above the body $c$ or at one side thereof. The shaft $g$ passes through a screw-cap, $h$, and packing, and terminates with a cylindrical plug, $k$, and crank-pin $i$, that passes through the valve-stem $t$. The cylindrical plug $k$ has a shoulder that bears against the seat at the end of the socket $f$, so that the shaft is supported at this point, and the parts rendered water-tight or nearly so. Within the socket $f$ is a spring, $l$, one end of which is attached to the plug $k$ and the other end to a polygonal bush, $n$, (shown detached in Fig. 3,) that enters a correspondingly-shaped recess at the end of the socket $f$, and is confined therein by the cap $h$.

It will now be evident that the parts are to be placed together with the spring $l$, coiled sufficiently to press the valve firmly to its seat, and that the spring can be wound up to whatever extent is desirable by revolving the polygonal washer previous to forcing it back into its recess. After this the cap $h$ is put on, and then the handle $m$ is secured to the shaft or spindle $g$.

By partially rotating the shaft $g$ against the action of the spring the crank $i$ will lift the valve, opening the water-way. When the handle is liberated the spring immediately closes the cock by forcing the valve to its seat.

I claim as my invention—

The shaft $g$, crank $i$, spring $l$, and polygonal bush $n$, in combination with the valve $d$ and body of the cock, substantially as set forth.

Signed by me this 3d day of December, A. D. 1872.

JOHN W. TRAFTON.

Witnesses:
W. S. GREENE,
JAS. F. TRAFTON.